United States Patent

Ishikawa et al.

[11] Patent Number: 5,969,767
[45] Date of Patent: Oct. 19, 1999

[54] MULTIPICTURE VIDEO SIGNAL DISPLAY APPARATUS WITH MODIFIED PICTURE INDICATION

[75] Inventors: Kenji Ishikawa, Hirakata; Eiichi Ashida; Kinya Kanno, both of Suita, all of Japan

[73] Assignee: Matsushita Electric Industrial Co., Ltd., Osaka, Japan

[21] Appl. No.: 08/697,958

[22] Filed: Sep. 4, 1996

[30] Foreign Application Priority Data

Sep. 8, 1995 [JP] Japan ................................. 7-231140
Oct. 5, 1995 [JP] Japan ................................. 7-258454

[51] Int. Cl.$^6$ .............................. H04N 5/445; H04N 5/45
[52] U.S. Cl. .......................... 348/564; 348/565; 348/566; 348/569; 348/588
[58] Field of Search .................... 348/564, 565, 348/566, 567, 568, 569, 588, 589; H04N 5/445, 5/45

[56] References Cited

U.S. PATENT DOCUMENTS 4,959,719  9/1990  Strubbe .
5,398,074  3/1995  Duffield et al. .
5,635,984  6/1997  Lee ............................................. 348/564

FOREIGN PATENT DOCUMENTS 0 376 376   7/1990   European Pat. Off. .
0 536 897   3/1993   European Pat. Off. .
2 275 585   8/1994   European Pat. Off. .
0 713 334   5/1996   European Pat. Off. .

OTHER PUBLICATIONS

European Search Report corresponding to EP 96306497.7 dated Oct. 6, 1991.

*Primary Examiner*—Sherrie Hsia
*Attorney, Agent, or Firm*—Ratner & Prestia

[57] ABSTRACT

A video signal apparatus allows multiple pictures to be displayed. A plurality of input video signals are processed to produce a plurality of signals corresponding to a respective plurality of pictures. The plurality of pictures corresponding to the plurality of signals are displayed. At least one of the plurality of pictures which have been displayed is selected. First and second modifications are made to the selected picture. The first modification to the selected picture indicates that the selected picture is being provided with the second modification.

12 Claims, 7 Drawing Sheets

MULTIPICTURE VIDEO SIGNAL DISPLAY APPARATUS WITH MODIFIED PICTURE INDICATION

BACKGROUND OF THE INVENTION

The present invention relates to a display apparatus in which a plurality of pictures are displayed on a single screen by sharing pictures on a plane separately or partially overlapped. Especially, it relates to a video signal display apparatus which can display an indication on the picture so as to be able to correctly recognize the picture which a user is now adjusting (handling), when the user selects a picture which the user wants among a plurality of pictures and adjusts brightness, contrast, color, hue and the like of each picture.

In recent years, displaying by sharing various kinds of video signals into a plurality of pictures has increased and complexity of picture handling concerning to adjustment or switching of picture display according to an input source has also increased.

Therefore, video signal display apparatus which can display multipicture with easy handling at picture handling have been desired for users.

Taking a case displaying two pictures on a screen, the performance of a video signal display apparatus in accordance with the prior art is explained below, referring to the drawings.

FIG. 1 is a block diagram of a video signal display apparatus in accordance with the prior art. The block 1 is a first video signal processing means inputting a first video signal 1a and outputting a luminance signal 1b and a color signal 1c. The block 2 is a second video signal processing means inputting a second video signal 2a and outputting a luminance signal 2b and a color signal 2c. The block 77 is a handling signal discriminating means inputting a picture handling signal 7a from a remote control box and the like and outputting a selection signal 77b according to handling information. The block 9 is an on-screen circuit outputting a display information signal 9b according to the selection signal 77b.

A video signal display apparatus configured like the above in accordance with the prior art is explained below, referring to FIGS. 1 and 3.

A display example in which a screen is divided into two pictures is shown in FIG. 3. When the user handles (selects) a channel for picture 2, a handling button corresponding to the picture 2 is pushed through remote control box or the like and then the channel is selected. A picture handling signal 7a based on the signal generated at the remote control box or the like is supplied to a handling signal discriminating means 77, it is detected that the button for picture 2 was pushed and a selection signal 77b indicating that the picture 2 was selected is outputted. At the on-screen circuit 9, a display information signal 9b according to the selection signal 77b is outputted and the user can recognize through the information on the screen that the picture he/she is selecting is picture 2. In FIG. 3, an indication that "picture is under handling" and a channel number indicating handling information are displayed on the screen.

In the above configuration, however, when the number of divided pictures increases, the picture which is now selected can be recognized only by the displayed information and it is difficult to see which picture is now selected and the other picture than the user wants is sometimes handled by mistake. Thus, there is a problem that picture handling is extremely deteriorated at an increased number of picture divisions.

A block diagram of a partially improved video signal display apparatus in accordance with the prior art is shown in FIG. 2. The block 1 is a first video signal processing means inputting a first video signal 1a and outputting a luminance signal 1b and a color signal 1c. The block 2 is a second video signal processing means inputting a second video signal 2a and outputting a luminance signal 2b and a color signal 2c. The block 33 is a first handling information detecting means inputting first to n-th picture handling information signals and outputting a display information signal 33b according to display information. The block 34 is a second handling information detecting means inputting first to n-th picture handling information signals and outputting a display information signal 34b according to display information. The block 8 is a picture display means inputting a first luminance signal 1b, a first color signal 1c, a first display information signal 33b, a second luminance signal 2b, a second color signal 2c and a second display information signal 34b and outputting a synthesized video signal 8b (based upon control signal 8a) after a deflection processing.

A video signal display apparatus configured like the above in accordance with the prior art is explained below, referring to FIGS. 2 to 5. FIG. 4 is a block diagram of a first handling information detecting means 33 of a video signal display apparatus. Also a second handling information detecting means 34 has the same configuration.

The block 331 is a decode circuit inputting first to n-th picture handling information signals, 33a1 to 33an and generating a handling information address signal 331b according to the inputted handling information. The block 332 is an ROM table circuit inputting the handling information address signal 331b and outputting a display information data signal 332b. The block 333 is a D/A converter converting the display information data signal 332b (digital) into a display information signal 33b (analog) and outputting the converted signal 33b.

As shown in FIG. 5, when the user handles picture 1, picture handling is done by pushing a handling button corresponding to picture 1 by the remote control box or the like. In this case, first to n-th picture handling information signals, 33a1 to 33an, according to picture handling are inputted to the first handling information detecting means 33.

At the decode circuit 331, the input signal is decoded, a state in which the picture is now being handled is detected and the handling information address signal 331b corresponding to the display information data stored in the ROM table circuit 332 of the next stage is generated. The display information data signal 332b outputted from the ROM table circuit 332 is outputted from the D/A converter 333 as a display information signal 33b and a picture according to the handling is displayed on the screen 1 as shown in FIG. 3.

In the above configuration, because handling buttons corresponding to each of pictures 1 and 2 are provided on the remote control box as shown in FIG. 5, inconvenience is removed that the other picture than the picture which the user wants to handle is handled by mistake. However, when the number of picture divisions increases, it is necessary to provide a set of handling buttons on the picture handling box (remote control box) corresponding to each picture and it brings problems that handling gets difficult at a multipicture display system and the picture handling box becomes too big.

SUMMARY OF THE INVENTION

Considering the above-mentioned problems, the present invention aims to present a video signal display apparatus having a almost same size as a current model without extremely deteriorating the handling easiness of a handling box, even when the number of picture divisions increases.

To solve the above-mentioned problems, the present invention presents a video signal display apparatus including:

multipicture processing means for signal processing so as to display a plurality of video signals as a plurality of pictures;

picture display means for displaying the output of the multipicture processing means as a plurality of pictures;

picture selecting means for selecting a picture among the pictures displayed on the picture display means;

picture special display means for generating a signal for displaying the picture selected at the picture selecting means; and picture adjusting means for adjusting the picture which is given a special display by the picture special display means; and wherein the picture which is given a special display by the the picture special display means displays that the picture is now under handling (adjusting) using the picture adjusting means.

Especially, the difference between the selected picture and the nonselected pictures can be made clearer by that the picture special display means gives a special display so that the brightness of the picture selected at the picture selecting means is different from the brightness of each nonselected picture. To be more concrete, the handling can be more improved by displaying the brightness of the selected picture brighter than the brightness of each nonselected picture.

Still further, the difference between the selected picture and the nonselected pictures can be made clearer by that the picture special display means gives a special display so that the display area of the picture selected at the picture selecting means is different from the display areas of the nonselected pictures. To be more concrete, it can be indicated more clearly that the picture is now under handling by giving a special display so that the display area of the selected picture is larger than the display areas of the nonselected pictures.

According to the present invention, even when the number of picture divisions increases, the picture which is selected and now being handled can be perceived without fail and the user hardly handle another picture by mistake.

Further, it is not necessary to have handling information corresponding to every picture, the handling ability of the picture handling box (remote control box) can be improved and the box size can be made almost same as the current size.

BRIEF DESCRIPTION OF THE DRAWINGS

FIG. 8($b$) shows a relation between a luminance signal and a picture displayed at main picture (picture A) handling of a video signal display apparatus in accordance with the second exemplary embodiment of the present invention.

FIG. 11($b$) shows a relation between a luminance signal and a picture displayed at picture A handling of a video signal display apparatus in accordance with the third exemplary embodiment of the present invention.

DESCRIPTION OF THE PREFERRED EMBODIMENTS (First Exemplary Embodiment)

Figure 1:
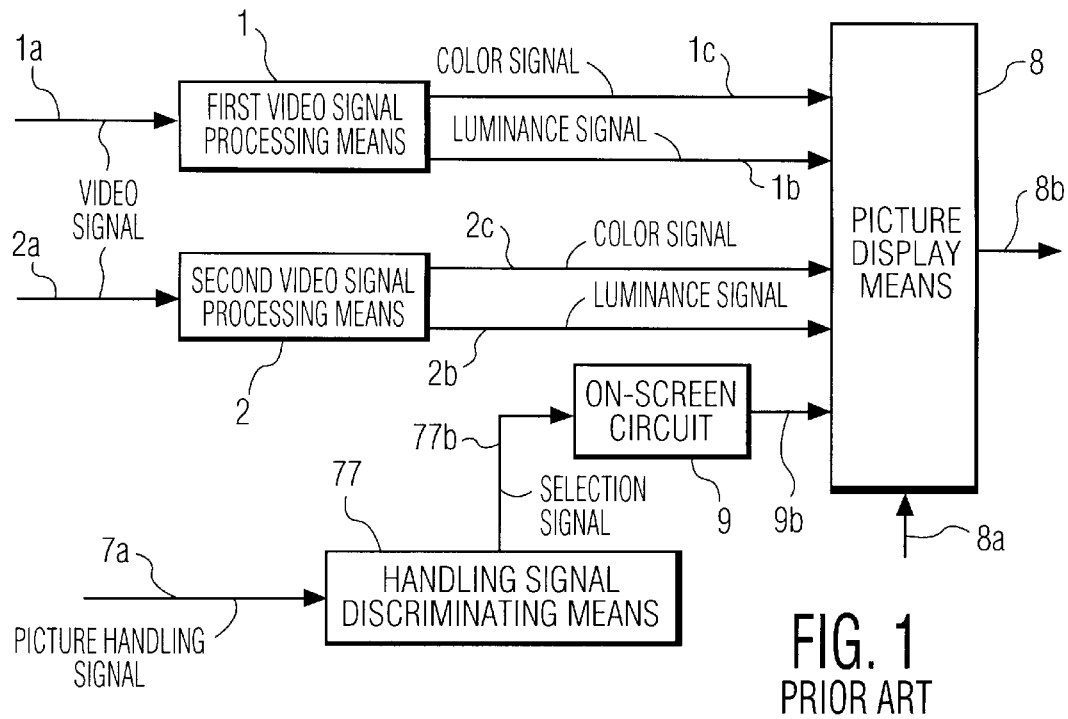
FIG. 1 is a block diagram of a video signal display apparatus in accordance with the prior art.
Figure 2:
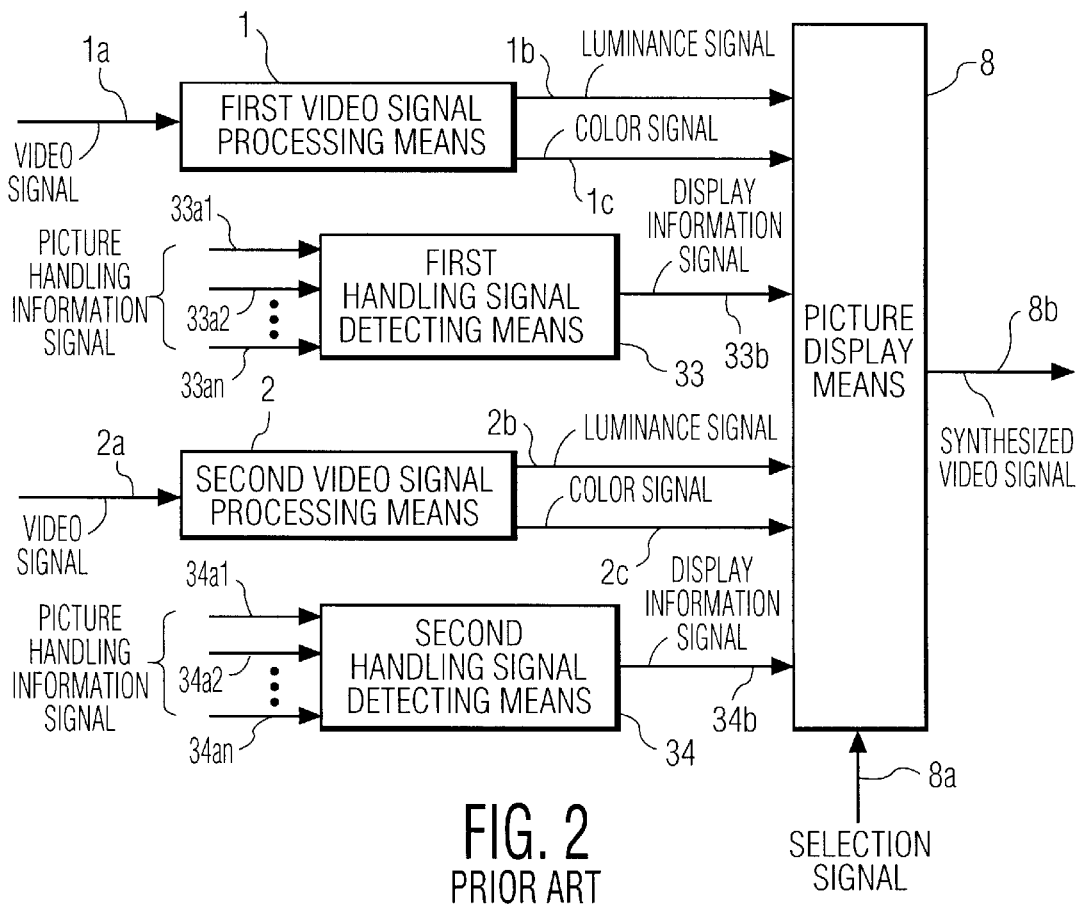
FIG. 2 is a block diagram of a partially improved video signal display apparatus in accordance with the prior art.
Figure 3:
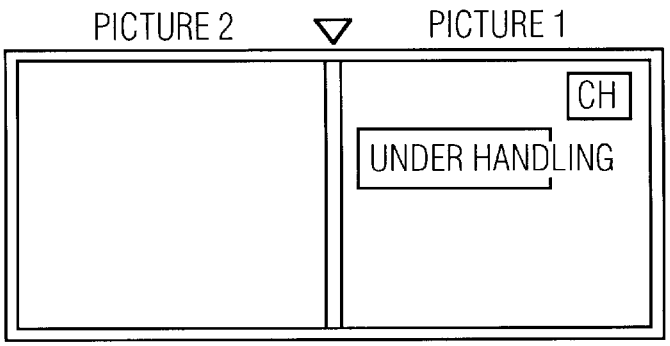
FIG. 3 shows an example of a displayed picture of a partially improved video signal display apparatus in accordance with the prior art.
Figure 4:
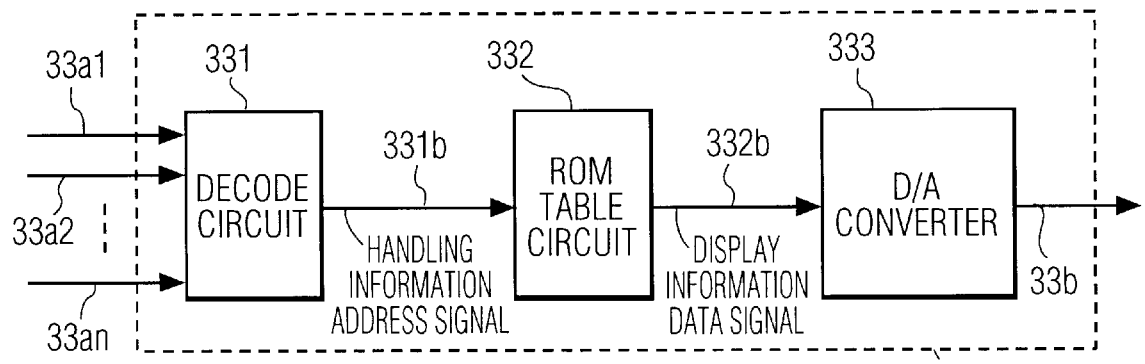
FIG. 4 is a block diagram of a handling information detecting means of a video signal display apparatus in accordance with the prior art.
Figure 5:
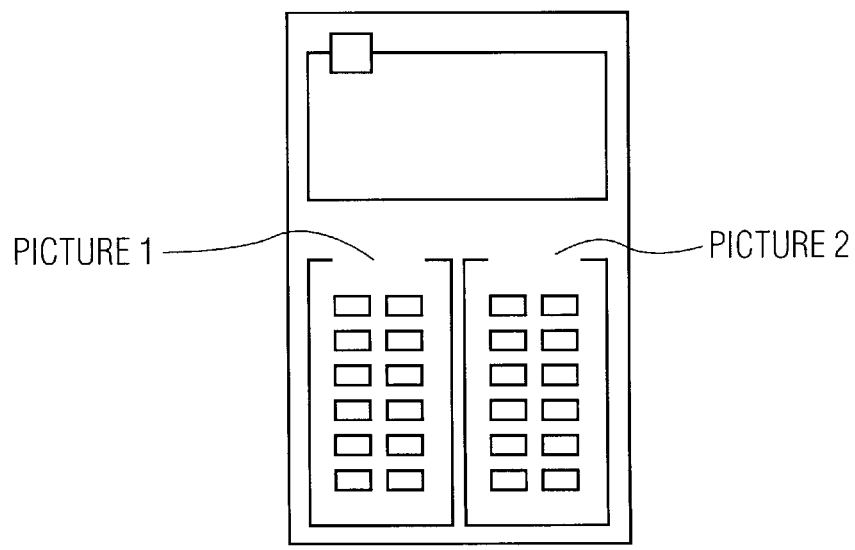
FIG. 5 shows a picture handling box of a video signal display apparatus in accordance with the prior art.
Figure 6:
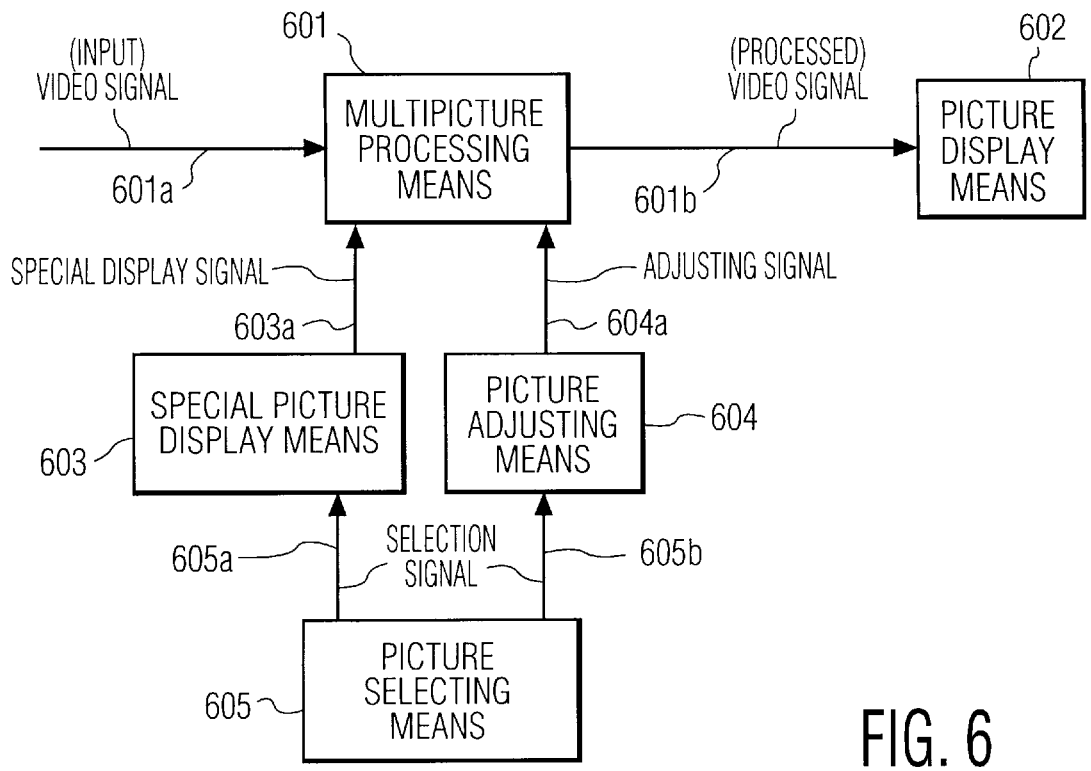
FIG. 6 is a block diagram of a video signal display apparatus in accordance with a first exemplary embodiment of the present invention.

A block diagram of a video signal display apparatus in accordance with a first exemplary embodiment of the present invention is shown in FIG. 6.

A signal 601$a$ containing a plurality of video signals is inputted to multipicture processing means, where a processing is done to convert it into a signal 601$b$ which is divided into the original video signals and can simultaneously display a plurality of pictures on a picture display means 602.

Signals 605$a$ and 605$b$ to select one or some of the plurality of pictures displayed on the picture display means 602 are outputted from picture selecting means 605 according to a command from a remote control box or the like and supplied to picture special display means 603 and picture adjusting means 604, respectively.

Being inputted signal 605$a$, picture special display means 603 outputs a signal 603$a$ to give a special display of the selected picture to multipicture processing means 601.

Multipicture processing means 601 gives a special display such as increasing of the brightness of the selected input video signal, expansion of the picture area, display of "under handling" and the like according to the inputted signal 605*a* and supplies a signal 601*b* to picture display means 602.

The signal 605*b* outputted from picture selecting means 605 according to a command from the remote control box or the like is inputted to picture adjusting means 604 and the contrast, the color and the like can be adjusted for the selected one or some of the plurality of pictures according to a command from the remote control box or the like. The adjusting signal 604*a* is supplied to multipicture processing means 601, where the contrast, the color and the like are adjusted for the signal of the selected picture and the processed signal 601*b* is supplied to picture display means 602.

From the signal flow described above, (1) one or some of the plurality of pictures selected at picture selecting means 605 is given a special display on picture display means 602, (2) the user handling a remote control box or the like certainly perceives the picture given a special display and can adjust the picture through the remote control box or the like and (3) the adjusted result is displayed on picture display means 602 and the user perceives the adjusted result.

Thus, according to the first exemplary embodiment of the present invention, even when the number of divided pictures increases, the user can certainly perceive the picture which is selected and now being adjusted, hardly handles another picture by mistake, it is unnecessary to have handling information corresponding to every picture and as a result, handling ability of the remote control box or the like can be improved and the box size can be almost same as the current one.

The most suitable display method for the special display is that discrimination from the other nonselected pictures is clear and the result which the picture was adjusted is clearly recognized. For example, if the special display is set so that the nonselected pictures are a little darker and the picture which the user want to select and adjust is brighter, it is easy to adjust the contrast, the color and the like be for the selected picture and the adjustment result becomes clear. If the special display is set so that the color tone of the picture which the user want to select and adjust is varied, discrimination from the other nonselected pictures is clear but the color tone of the picture which the user want to adjust has been varied. Therefore, it is difficult to perceive the adjusted result for the user who is handling a remote control box and it causes to mistake that the video signal display apparatus is out of order.

(Second Exemplary Embodiment)

A multipicture display apparatus in accordance with a second exemplary embodiment of the present invention is explained below, referring to the drawings.

Figure 7:
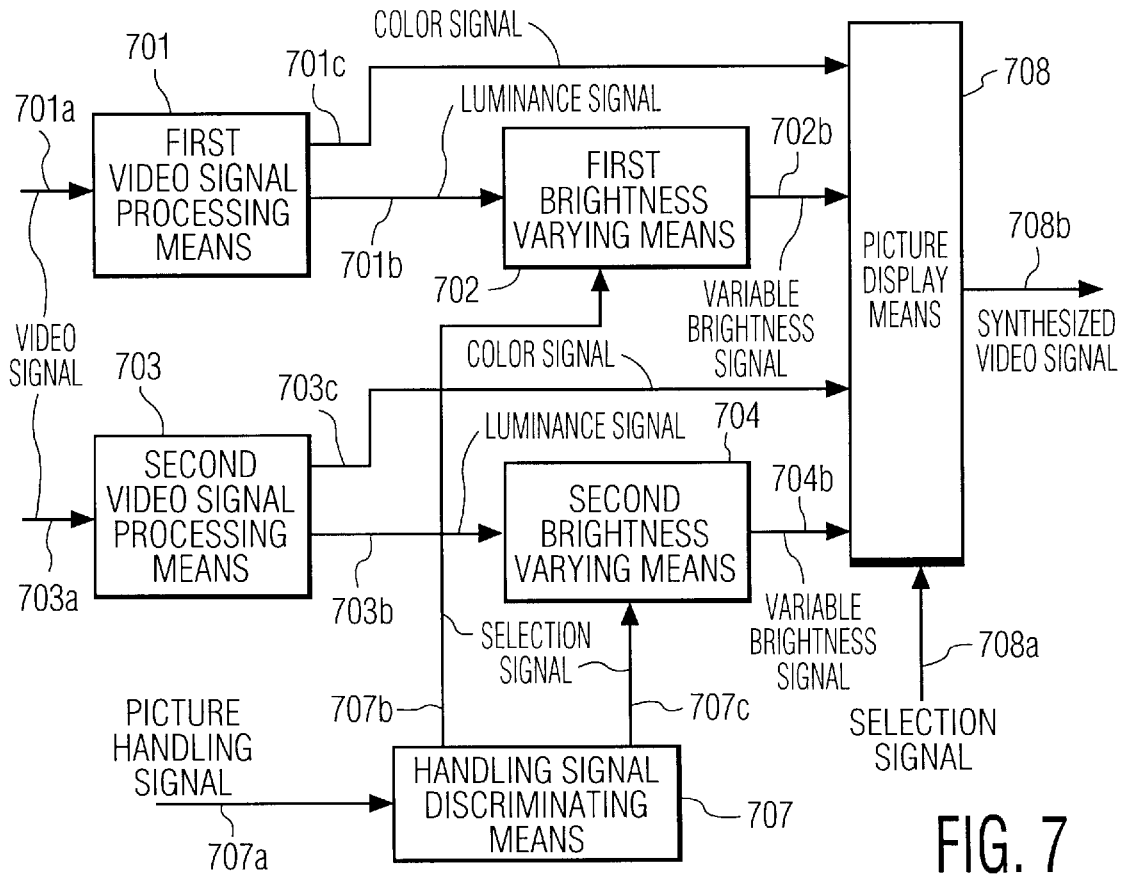
FIG. 7 is a block diagram of a video signal display apparatus in accordance with a second exemplary embodiment of the present invention.

A block diagram of a video signal display apparatus in accordance with a second exemplary embodiment of the present invention is shown in FIG. 7. (The case in which the screen is divided for two pictures is explained.)

The block 701 is a first video signal processing means inputting a first video signal 701*a* and outputting a luminance signal 701*b* and a color signal 701*c*. The block 703 is a second video signal processing means inputting a second video signal 703*a* and outputting a luminance signal 703*b* and a color signal 703*c*. The block 707 is a handling signal discriminating means inputting a picture handling signal 707*a* from a remote control box or the like and outputting a selection signal 707*b* according to handling information. The block 702 is a first brightness varying means inputting a luminance signal 701*b*, adjusting the amplitude of the luminance signal 701*b* according to selection signal 707*b* and outputting a variable brightness signal 702*b*. The block 704 is a second brightness varying means inputting a luminance signal 703*b*, adjusting the amplitude of the luminance signal 703*b* according to selection signal 707*c* and outputting a variable brightness signal 704*b*. The block 708 is a picture display means processing the deflection of the first and second video signals according to selection signal 708*a* and outputting a synthesized video signal 708*b*.

The performance of the video signal display apparatus configured like the above is explained below.

Figure 9:
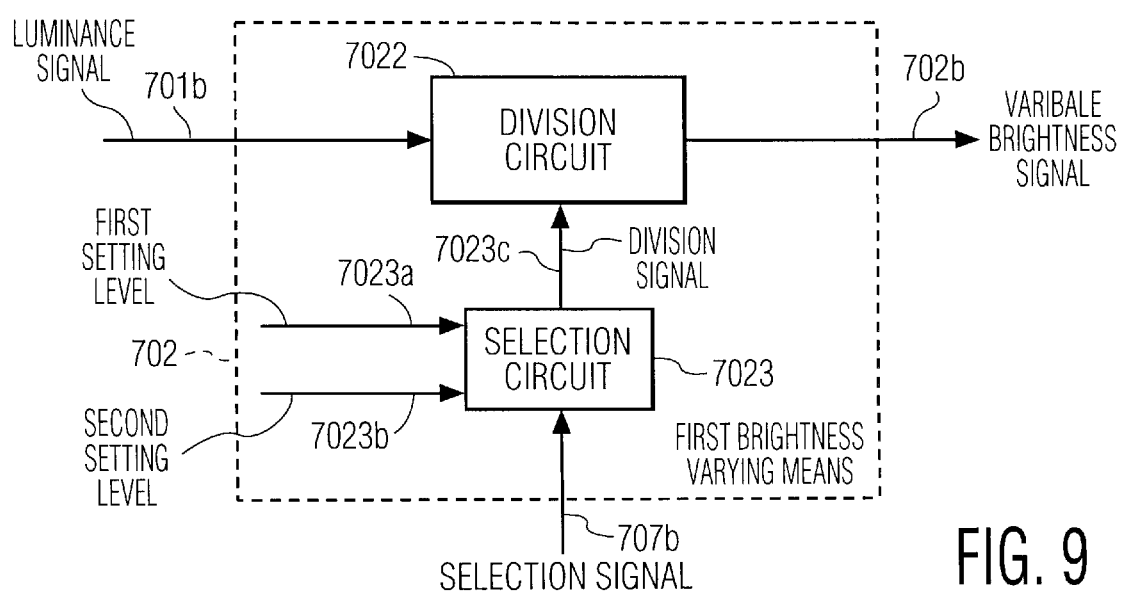
FIG. 9 is a block diagram of a brightness varying means of a video signal display apparatus in accordance with the second exemplary embodiment of the present invention.

FIG. 9 is a block diagram of first brightness varying means 702. (Also second brightness varying means 704 has the same configuration.) The block 7023 is a selection circuit for outputting either a first setting level 7023*a* (level is larger than 1) or a second setting level 7023*b* (level is 1) (both are setting values for the system) according to a selection signal 707*b* supplied from handling signal discriminating means 707 as a dividing signal 7023*c*. In this example, the first setting level 7023*a* is outputted when the signal is low level and the second setting level 7023*b* is outputted when the signal is high level. The 7022 is a division circuit executing a division of a luminance signal 701*b* outputted from video signal processing means 701 as a dividend and a division signal 7023*c* as a divisor and outputting a variable brightness signal 702*b*.

Therefore, if the first setting level 7023*a* is selected (when selection signal 707*b* is low level), the amplitude of input luminance signal 701*b* becomes small and if the second setting level 7023*b* is selected (when selection signal 707*b* is high level), the luminance signal 701*b* does not attenuate and is outputted with the same amplitude as that of the input signal.

Figure 8A:
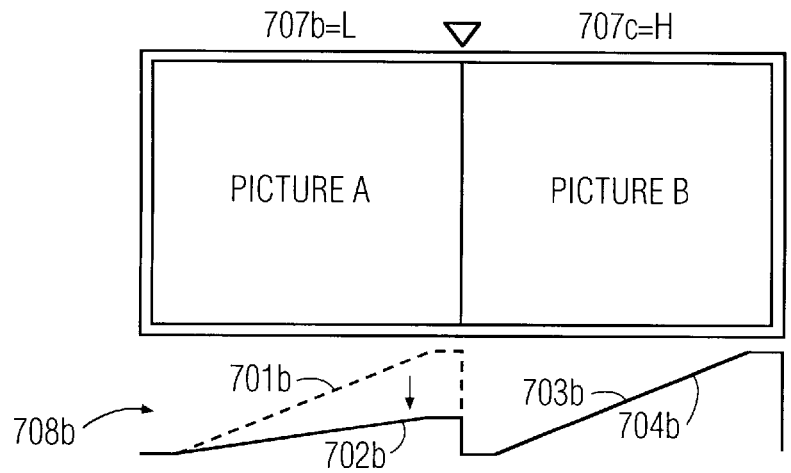
FIG. 8($a$) shows a relation between a luminance signal and a picture displayed at subpicture (picture B) handling of a video signal display apparatus in accordance with the second exemplary embodiment of the present invention.
Figure 8B:
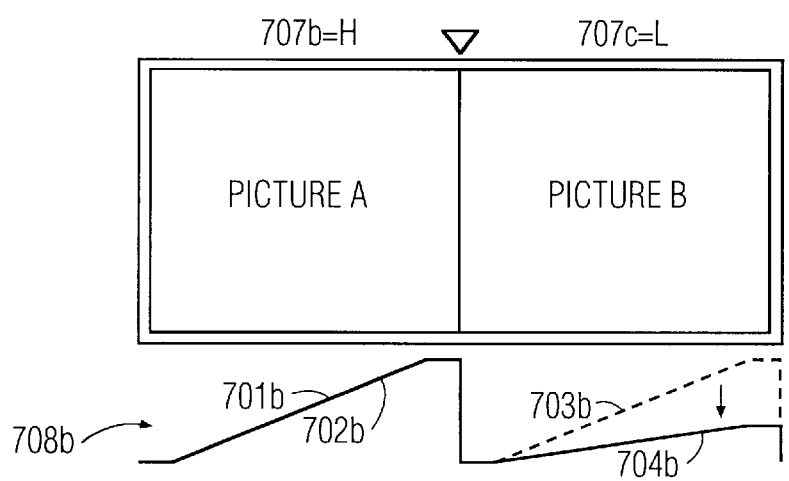

As shown in FIG. 8(*a*), when picture B is handled, the user handles the handling buttons of a picture handling box such as a remote control box corresponding to picture B.

Handling signal discriminating means 707 discriminates the picture selected by the user out of a picture handling signal 707*a* outputs a selection signal of the selected picture with high level and outputs a selection signal of the nonselected picture with low level. Accordingly, selection signal 707*b* is set at low level and selection signal 707*c* is set at high level.

First luminance signal 701*b* separated at first video signal processing means 701 is inputted to first brightness varying means 702 and an operation of division is executed. Because selection signal 707*b* is set at low level, the amplitude of first luminance signal 701*b* becomes small and outputted as a variable brightness signal 702*b*, as shown in FIG. 8(*a*).

The amplitude of second luminance signal 703*b* inputted to second brightness varying means 704 is outputted as a variable brightness signal 704*b* without attenuation.

Processing for deflection, deflection timing and display timing of the luminance and color signals at picture display is executed at picture display means 708 and a synthesized video signal 708*b* is outputted. (Picture display may be made by magnetic deflection such as a cathode ray tube or by plane matrix scanning such as liquid crystal display or the like.) The luminance signal is smaller in picture A than in picture B and the nonselected picture A is displayed darker than the selected picture B at picture display.

FIG. 8(*b*) shows a signal level when picture A is selected. Inputted luminance signal 703*b* becomes small and is outputted from second brightness varying means 704 as a variable brightness signal 704*b*. First brightness signal 701*b* is outputted as a variable brightness signal 702*b* without attenuation and the nonselected picture B is displayed darker than the selected picture A.

Thus, picture can be more certainly selected by displaying the picture selected by the user brighter than the nonselected picture.

Finishing a series of picture handling, the amplitude of the luminance signal is set back to the amplitude before handling by a selection signal.

The nonselected picture becomes darker and it becomes easy to certainly perceive the selected picture and the wrong picture (nonselected picture) is hardly handled by mistake at multipicture display.

(Third Exemplary Embodiment)

A multipicture display apparatus in accordance with a third exemplary embodiment of the present invention is explained below, referring to the drawings.

Figure 10:
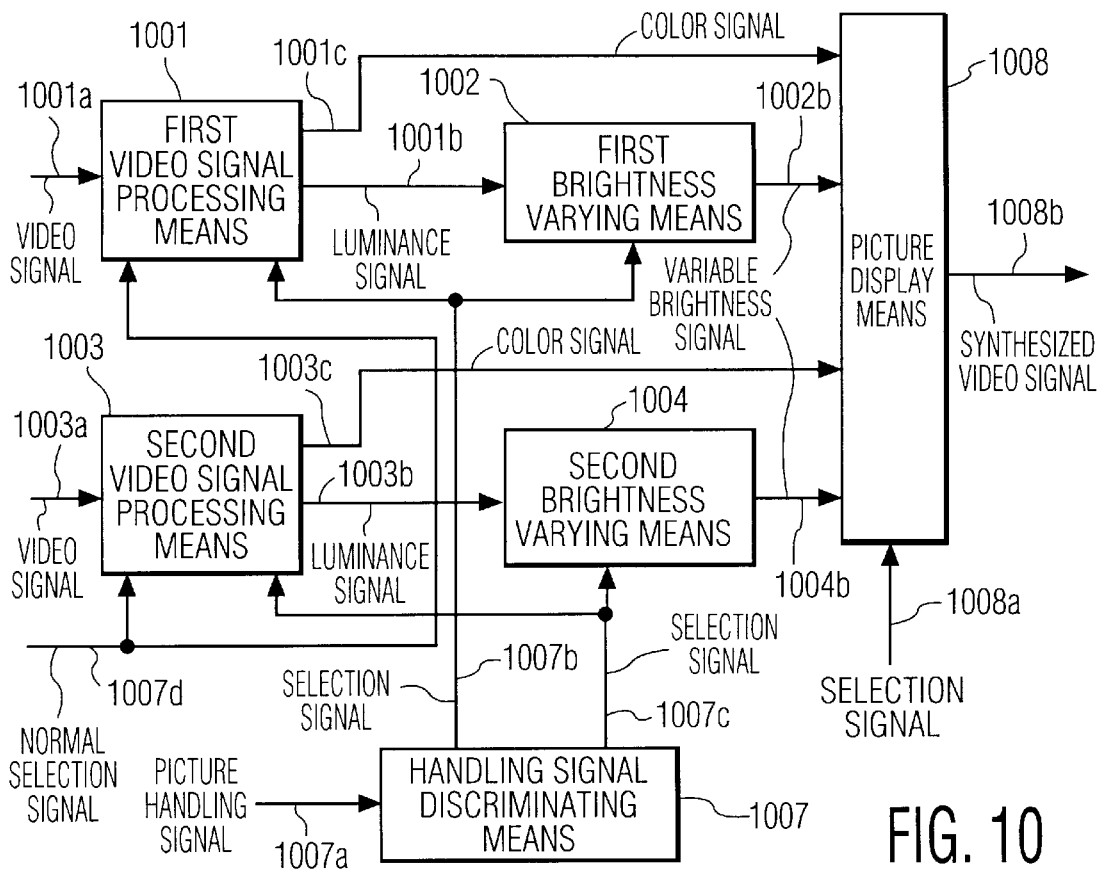
FIG. 10 is a block diagram of a video signal display apparatus in accordance with a third exemplary embodiment of the present invention.

A block diagram of a video signal display apparatus in accordance with a third exemplary embodiment of the present invention is shown in FIG. 10. First brightness varying means 1002, second brightness varying means 1004, handling signal discriminating means 1007, picture display means 1008 are in the same configuration as the second exemplary embodiment of the present invention. The difference is in first video signal processing means 1001 and second video signal processing means 1003.

Figure 12:
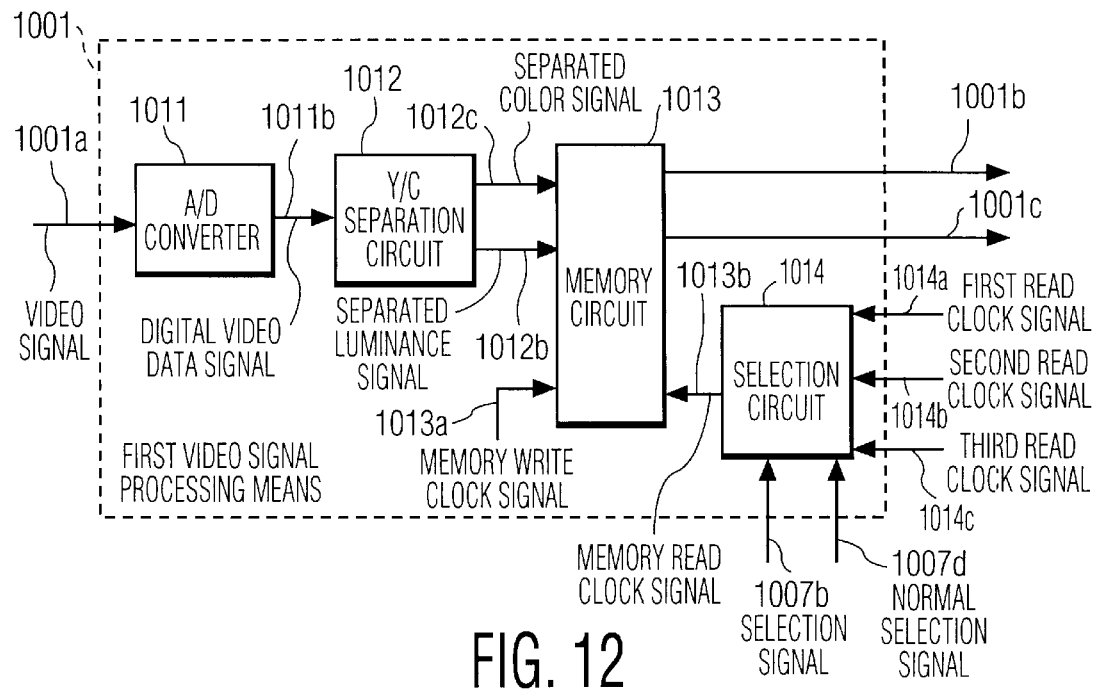
FIG. 12 is a block diagram of a video signal processing means of a video signal display apparatus in accordance with the third exemplary embodiment of the present invention.

FIG. 12 is a block diagram of first video signal processing means 1001. (Also second video signal processing means 1003 has the same configuration.) The block 1011 is an A/D converter for converting an input video signal 1001a into a digital video data signal 1011b. The block 1012 is a Y/C separation circuit for outputting a separated luminance signal 1012b and a separated color signal 1012c from the A/D converted digital video data signal 1011b. The block 1014 is a selection circuit for selecting any one of first read clock signal 1014a, second read clock signal 1014b (normal read speed) and third read clock signal 1014c by a selection signal 1007b and a normal selection signal 1007d from the system and outputting a memory read clock signal 1013b. (In this example, read speeds are defined as 1014a>1014b>1014c.) The block 1013 is a memory circuit composed of an FIFO (first-in first-out) or the like for writing the separated luminance signal 1001b and the separated color signal 1001c according to the memory write clock signal 1013a and reading the first luminance signal 1001b and the first color signal 1012c according to the memory read clock signal 1013b.

Figure 11A:
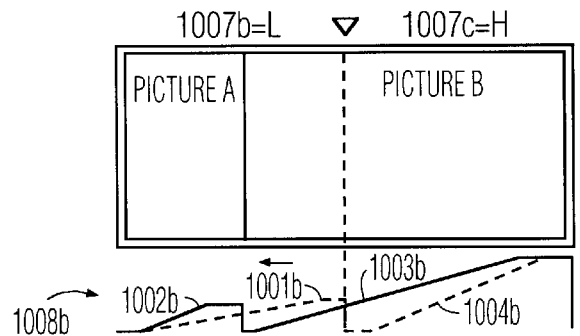
FIG. 11($a$) shows a relation between a luminance signal and a picture displayed at picture B handling of a video signal display apparatus in accordance with the third exemplary embodiment of the present invention.

When picture B is selected as a picture to be handled as shown in FIG. 11(a), first read clock signal 1014a is selected as memory read clock signal 1013b of first video signal processing means 1001 in order to read the data more quickly than a normal read speed. Third read clock signal 1014c is selected as memory read clock signal 1013b of second video signal processing means 1003 corresponding to picture B in order to read the data more slowly than the normal read speed. When the data in memory circuit 1013 is read with each selected clock signal, the display area of picture A which is not desired to be handled is small and the display area of picture B which is desired to be handled is large.

Figure 11B:
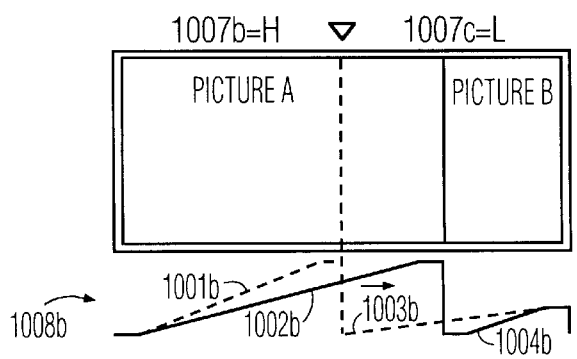

Similarly, when picture A is selected as shown in FIG. 11(b), the display area for picture A becomes large by making the read clock signal for selected picture A slow and the read clock signal for selected picture B fast.

Thus, according to the third exemplary embodiment of the present invention, the display area of the selected picture can be made larger than the normal display area and because the user can perceive the selected picture more certainly, it is prevented to handle a wrong picture (picture not to be handled) by mistake.

Because the displayed area is larger than the area of the nonselected picture, it is possible to perceive the selected picture more certainly and when a desired picture of the multipicture is handled, cases in which a nondesired picture is handled can be extremely reduced. It is obvious that a similar effect is obtained even if the display area of picture A is expanded to the whole display area of video signal display apparatus 1008.

(Fourth Exemplary Embodiment)

A multipicture display apparatus in accordance with a fourth exemplary embodiment of the present invention is explained below, referring to the drawings.

Figure 13:
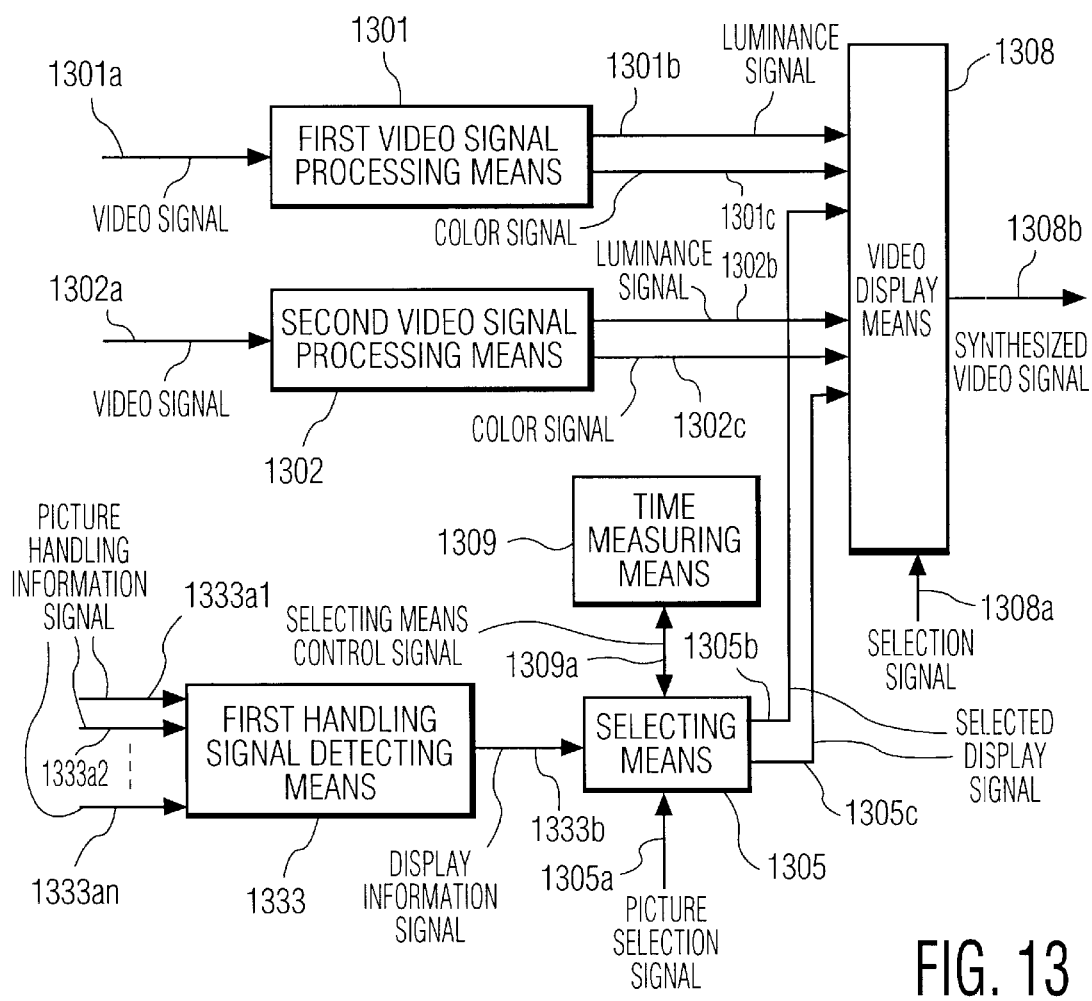
FIG. 13 is a block diagram of a video signal display apparatus in accordance with a fourth exemplary embodiment of the present invention.

A block diagram of a video signal display apparatus in accordance with a fourth exemplary embodiment of the present invention is shown in FIG. 13. In this example, the case in which the screen is divided for two pictures is explained. In FIG. 13, the block 1301 is first video signal processing means inputting a first video signal 1301a and outputting a first luminance signal 1301b and a first color signal 1301c. The block 1302 is second video signal processing means inputting a second video signal 1302a and outputting a second luminance signal 1302b and a second color signal 1302c.

The block 1333 is handling information detecting means inputting picture handling information signals from 1333a1 to 1333an from a picture handling box (remote control box) and outputting a display information signal 1333b. The block 1305 is a selection circuit inputting a display information signal 1333b and outputting either a first selection display signal 1305b or a second selection display signal 1305c according to a picture selection signal 1305a indicating information of the picture which is now selected.

The block 1309 is a time measuring means for measuring a time from the time when the picture selection signal is inputted when a picture handling information signal other than the first picture handling information signal is selected at selecting means 1305 and for outputting selecting means control signal 1309a controlling selecting means 1305 so as to automatically select the first picture handling information signal in the case in which the picture selection signal is not inputted again during a fixed period from the time when the picture selection signal is inputted. The block 1308 is picture display means and inputs first luminance signal 1301b, first color signal 1301c, first selected display signal 1305b, second luminance signal 1302b, second color signal 1302c and second selected display signal 1305c, processes deflection according to a display selection signal 1308a and outputs a synthesized video signal 1308b.

Figure 14:
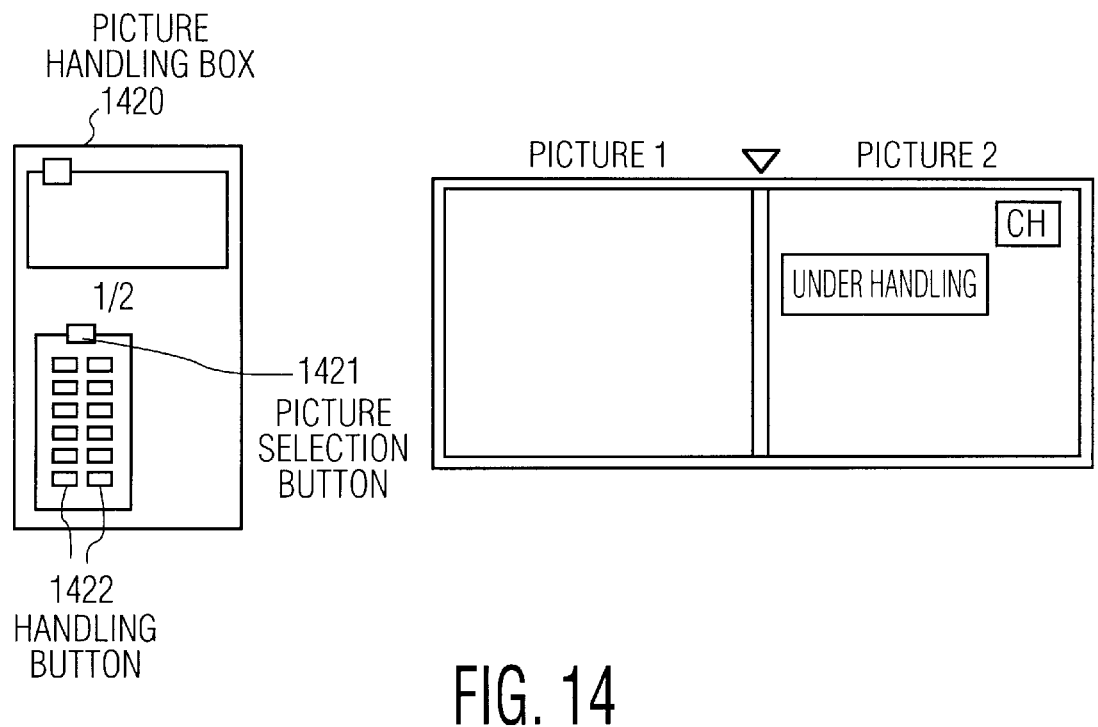
FIG. 14 shows a picture handling box and an example of a displayed picture in accordance with the fourth exemplary embodiment of the present invention.
Figure 15:
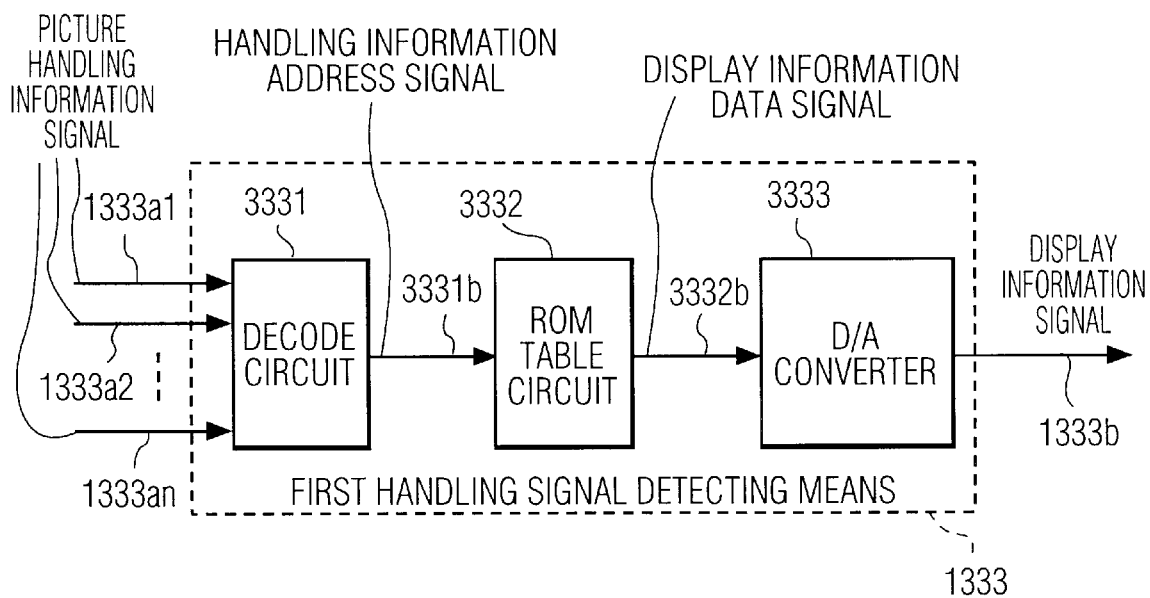
FIG. 15 is a block diagram of a handling information detecting means of a video signal display apparatus in accordance with the fourth exemplary embodiment of the present invention.

The function of a video signal display apparatus configured like the above is explained below, referring to FIGS. 13, 14 and 15. As shown in FIG. 14, the picture 2 is selected by a picture selection button 1421 of a handling box 1420 (remote control box) and then picture is handled by pushing handling buttons 1422. The first to n-th picture handling information signals, 1333a1 to 1333an, which are information for handling buttons, are inputted to a decode circuit 3331 of handling information detecting means 1333. The information which the [0ax0]icture which is now being handled is detected at decode circuit 3331 shown in FIG. 15 and a handling information address signal 3331b which is conincident with a display information stored in an ROM table circuit 3332 is generated. Accordingly, a display information data signal 3332b corresponding to the handling information is outputted from ROM table circuit 3332 and is outputted from an D/A (digital to analog) converter 3333 as a display information signal 1333b.

Selecting means 1305 selects a second selection display signal 1305c from the inputted display information signal 1333b according to a picture selection signal 1305a (picture 2 is selected) selected by picture selection button 1421 and outputs the second selection display signal 1305c. No signal is outputted as a first selection signal 1305b.

Deflection timing and display timing of the luminance and color signals are processed for each picture at picture display means 1308, the processed signal is outputted as a synthesized video signal and handling information is displayed on the screen 2 as shown in FIG. 14.

Also when the picture 1 is handled, a similar information can be displayed on the screen 1 in a similarly handling way of the handling buttons 1422, by pressing a picture selection button 1421.

Further, unless the remote control box is handled during a fixed period, the picture selection is automatically returned to the picture 1, the display on the unnecessary picture is automatically erased by switching off the display information signal 1333b superimposed on the video signal for picture 2 and when the remote control box is next handled, the picture 1 which is mainly used is made to be selected as a handling object. Thus, a video signal display apparatus displaying a picture which is easy to use for a user by dividing into two screens can be presented.

Because when a picture of multipicture display is handled, only the selected picture is brightly displayed by discriminating the selected picture by handling signal discriminating means and making the luminance signal of the selected picture larger than that of the nonselected picture at the first to n-th brightness varying means and correct picture handling can be realized without fail.

There is no need to provide handling information for each picture, even when the number of divided pictures increases, the handling ability of the picture handling box is not deteriorated and the box size can be made almost same as the current one, because even when a picture of multipicture display is handled, handling information signals from the picture handling box are made common and the picture is displayed adding a display information signal to the luminance and color signals of the video signal corresponding to the picture which is now selected by selecting means by providing first video signal processing means inputting a first video signal and outputting a first luminance signal and a first color signal;

second video signal processing means inputting a second video signal and outputting a second luminance signal and a second color signal;

m-th video signal processing means inputting a m-th video signal and outputting a m-th luminance signal and a m-th color signal (where, m is a natural number);

handling information detecting means inputting first to N-th picture handling information signals and outputting a display information signal corresponding to each handling information (where, N is a natural number);

selecting means inputting the display information signal and outputting the first to the N-th selection display signals according to a picture selection signal;

picture display means inputting the first to the N-th luminance and color signals and the first to the N-th selection display signals, processing deflection according to a display selection signal and outputting a synthesized video signal.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A multipicture video signal display apparatus comprising:

multipicture processing means for signal processing a plurality of input video signals to produce a plurality of signals corresponding to a respective plurality of pictures, said plurality of pictures selectable between a first number of pictures and a second number of pictures;

picture display means for displaying the plurality of pictures corresponding to the plurality of signals;

picture selecting means for selecting at least one of the plurality of pictures displayed on said picture display means;

picture special display means for providing a first modification to the picture selected by said picture selecting means; and picture adjusting means for providing a second modification to the picture selected by said picture special display means;

wherein the first modification to said picture provided by said picture special display means indicates that the selected picture is being provided said second modification by said picture adjusting means.

2. A multipicture video signal display apparatus as recited in claim 1, wherein said picture special display means provides a special display so that a brightness of the picture selected by said picture selecting means is different from a brightness of said plurality of pictures not selected by the picture selecting means pictures.

3. A multipicture video signal display apparatus as recited in claim 2, wherein the brightness of the selected picture is brighter than said plurality of pictures not selected by said picture selecting means.

4. A multipicture video signal display apparatus as recited in claim 1, wherein said picture special display means provides a special display so that a display area of the picture selected by said picture selecting means is different from a display area of said plurality of pictures not selected by said picture selecting means.

5. A multipicture video signal display apparatus as recited in claim 4, wherein the display area of the selected picture is larger than the display area of said plurality of pictures not selected by said picture selecting means.

6. A multipicture video signal display apparatus as recited in claim 1, wherein said picture special display means provides a special display so that a character indicating that the displayed picture is under adjustment is displayed on the picture selected by said picture selecting means.

7. A multipicture video signal display apparatus for use with a picture handling device comprising:

control means for generating a plurality of control signals responsive to a signal from said picture handling device;

video signal processing means for processing an input video signal and for outputting a respective luminance signal and a respective color signal based on said input video signal;

brightness varying means for varying the brightness of the respective luminance signal from said video signal processing means according to a respective control signal from said picture handling device; and picture display means for displaying a plurality of pictures based on the respective color signal from said plurality of video signal processing means and the respective luminance signal from said brightness varying means.

8. A multipicture video signal display apparatus for use with a picture handling device comprising:

control means for generating a plurality of control signals responsive to a signal from the picture handling device;

video signal processing means for processing an video signal and for outputting a respective luminance signal and a respective color signal; and picture display means for displaying a plurality of pictures based on the respective luminance signal and the respective color signal output from said video signal processing means;

wherein said video signal processing means
a) provides a selection circuit which can select one of a plurality of clock signals,
b) selects the clock signals according to said plurality of control signals input from said control means,
c) processes the video signal and
d) varies a picture size based on one of said plurality of clock signals.

9. A multipicture video signal display apparatus for use with a picture handling device comprising:

first video signal processing means for processing a first video signal and generating a first luminance signal and a first color signal;

second video signal processing means for processing a second video signal and generating a second luminance signal and a second color signal;

m-th video signal processing means for processing an m-th video signal and generating an m-th luminance signal and an m-th color signal (where m is an integer number);

handling information detecting means for receiving a plurality of picture handling information signals from said picture handling device and outputting a display information signal corresponding to each respective handling information signal;

selecting means for sending at least one of a first to M-th selected display signals based on said display information signal and in accordance with a picture selection signal;

time measuring means for measuring a time period from a time when said picture selection signal is input,
wherein when said time period exceeds a predetermined time period said picture selection signal selects one of said plurality of picture handling information signals and picture display means for generating a synthesized video signal based on
a) said first to M-th luminance signals,
b) said first to M-th color signals and
c) said first to M-th selection display signals, and in accordance with said picture selection signal.

10. A multipicture video signal display apparatus comprising:

display means for displaying a plurality of video pictures simultaneously;

modifying means for modifying any one of said plurality of video pictures while said plurality of video pictures are simultaneously displayed on said display means; and means for adjusting one of said plurality of video pictures selected by said modifying means.

11. A multipicture video signal display apparatus comprising:

multipicture processing means for signal processing a plurality of input video signals to produce a plurality of signals corresponding to a respective plurality of pictures;

picture display means for displaying at least a portion of the plurality of pictures corresponding to the plurality of signals;

picture selecting means for selecting at least one of the plurality of pictures displayed on said picture display means;

picture special display means for providing a first modification to all of the displayed portion of the picture selected by said picture selecting means; and picture adjusting means for providing a second modification to the picture selected by said picture special display means;

wherein the first modification to said picture provided by said picture special display means indicates that the selected picture is being provided said second modification by said picture adjusting means.

12. The multi picture video signal display apparatus of claim 10, wherein said means for adjusting adjusts at least one of a luminance, a contrast and a color of said one of said plurality of video pictures selected by said modifying means.

* * * * *

UNITED STATES PATENT AND TRADE MARK OFFICE
CERTIFICATE OF CORRECTION

PATENT NO. : 5,969,767
DATED : October 19, 1999
INVENTOR(S) : Ishikawa et al.

It is certified that error appears in the above-identified patent and that said Letters Patent is hereby corrected as shown below:

Cover page, item [56] References Cited, Other Publications, "Oct. 6, 1991" should be --Oct. 6, 1997--.

Signed and Sealed this

Twenty-fourth Day of October, 2000

Attest:

Q. TODD DICKINSON

*Attesting Officer*  *Director of Patents and Trademarks*